United States Patent [19]

Uehara et al.

[11] Patent Number: 4,897,554

[45] Date of Patent: Jan. 30, 1990

[54] ENGINE STARTING APPARATUS

[75] Inventors: Yuzuru Uehara, Chiryu; Jiro Hanano, Toyota, both of Japan

[73] Assignee: Aisin Seiki Kabushiki Kaisha, Kariya, Japan

[21] Appl. No.: 250,331

[22] Filed: Sep. 28, 1988

[30] Foreign Application Priority Data

Sep. 30, 1987 [JP] Japan .......................... 62-148208[U]
Mar. 30, 1988 [JP] Japan .......................... 63-074655

[51] Int. Cl.[4] .......................... F02N 11/08; H02J 1/00

[52] U.S. Cl. .......................... 290/38 R; 290/38 C; 307/29; 307/38

[58] Field of Search .......................... 290/38 R, 38 C, 38 E, 290/DIG. 1, DIG. 3; 307/28, 29, 30, 38, 41; 318/101, 102, 103; 74/7 R; 123/179 R, 179 AS; 361/166, 167, 191, 202

[56] References Cited

U.S. PATENT DOCUMENTS

| | | | |
|---|---|---|---|
| 3,040,271 | 6/1962 | Murphy et al. | 307/38 X |
| 3,443,114 | 5/1969 | Morrison | 318/101 X |
| 3,836,788 | 9/1974 | Carlson et al. | 290/38 R X |
| 4,158,383 | 6/1979 | Rayfield | 361/166 X |
| 4,239,978 | 12/1980 | Kofink | 307/29 X |
| 4,318,006 | 3/1982 | Himeno et al. | 307/38 |
| 4,456,830 | 6/1984 | Cronin | 123/179 AS X |
| 4,653,442 | 3/1987 | Swenson | 290/38 C X |
| 4,777,379 | 10/1988 | Young | 307/41 |

*Primary Examiner*—A. D. Pellinen
*Assistant Examiner*—W. E. Duncanson, Jr.
*Attorney, Agent, or Firm*—Burns, Doane, Swecker & Mathis

[57] ABSTRACT

A starting apparatus includes an engine for driving a device such as a compressor, a starting motor by which the engine is brought into operation and a rectifier supplying a high DC voltage to the starting engine during operation thereof and supplying a low DC voltage to one or more electric components in the device while the starting motor is not in use. Thus, excess DC is prevented from being supplied to one or more components which operate under a low DC voltage, thereby preventing damage thereto.

10 Claims, 6 Drawing Sheets

ENGINE STARTING APPARATUS

BACKGROUND OF THE INVENTION

1. Field of the Invention

The present invention relates to a starting apparatus and in particular to a starting apparatus for starting one or more engines employed as driving means in a gas heat pump.

2. Description of the Prior Art

Generally speaking, for obtaining steady operation of an engine, the engine has to be assisted at the beginning of operation by a starting motor. The starting motor and electric components of a device which is operated by the engine are connected to a common rectifier. In such an arrangement, DC voltage is supplied to the electric components after completion of the operation of the starting motor. For effective or smooth starting operation, the starting motor is of relatively high power, thereby requiring a high DC voltage.

However, since each of such electric components is operated under a low DC voltage, excessive voltage is applied to each component, thereby damaging the components.

SUMMARY OF THE INVENTION

It is, therefore, a primary object of the present invention to provide a starting apparatus without the aforementioned drawbacks.

Another object of the present invention is to provide a starting apparatus in which a high voltage is output from a rectifier only while a starting motor is in operation.

To achieve these objects, and in accordance with the purposes of the present invention, a starting apparatus is provided which includes an engine for driving a device, a starting motor operatively connected to the engine and operated at intervals for starting the engine and a rectifier supplying a high DC voltage to the starting motor during operation thereof and supplying a low DC voltage to one or more electric components in the device when the starting motor is not in operation.

BRIEF DESCRIPTION OF THE DRAWINGS

The above and other objects, features and advantages of the present invention will become more apparent and more readily appreciated from the following detailed description of preferred exemplary embodiments of the present invention, taken in connection with the accompanying drawings, in which.

DETAILED DESCRIPTION OF THE PREFERRED EMBODIMENTS

Figure 1:
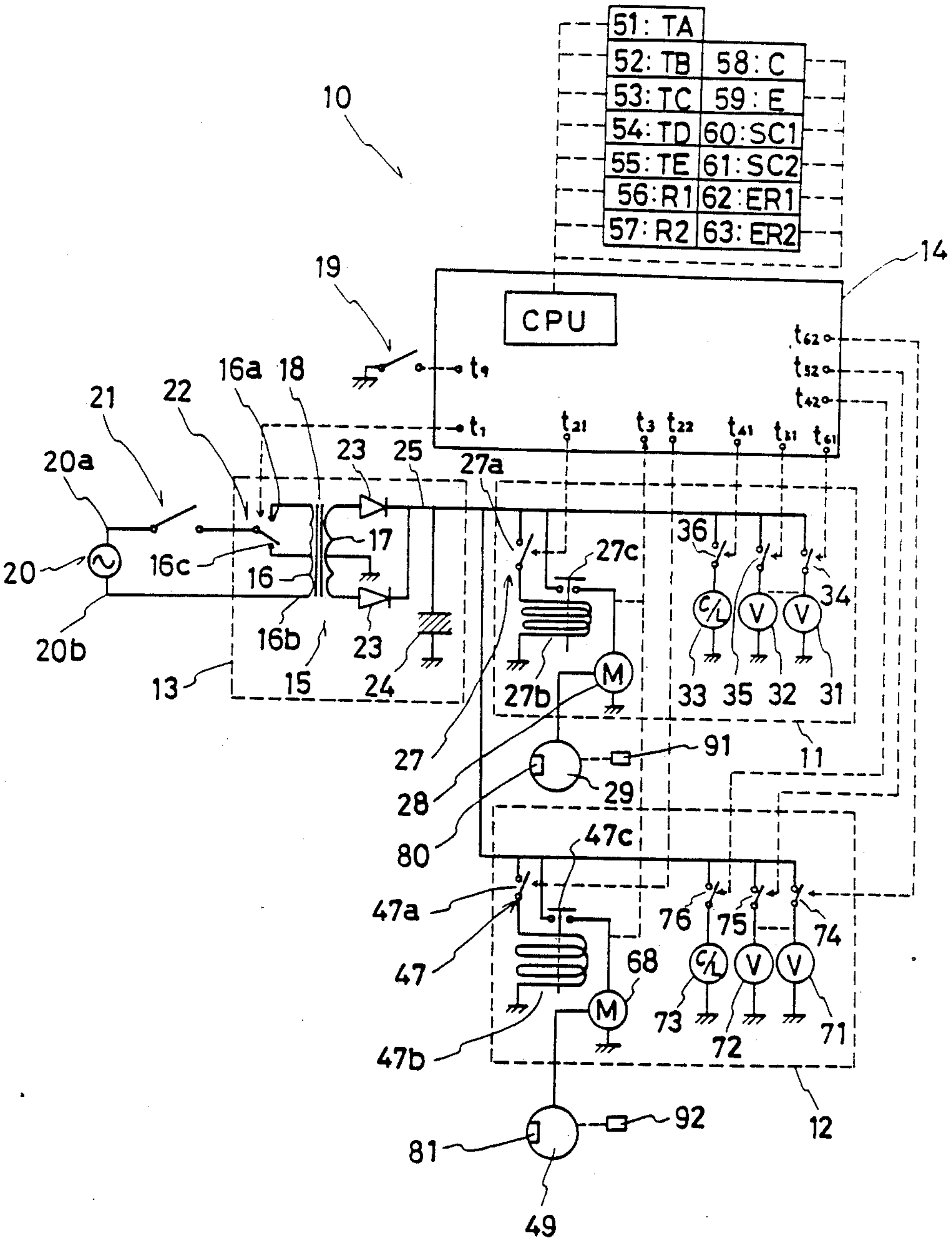
FIG. 1 is an electric circuit of a starting apparatus according to one embodiment of the present invention.

A starting apparatus 10 for use in an engine operated gas heat pump includes a first driving section 11, a second driving section 12 which is operated independently thereof and a rectifier 13 for supplying direct current in common to both driving sections 11 and 12. The driving sections 11 and 12 and the rectifier 13 are under the control of a control unit 14 which is in the form of a micro-computer. Since the first driving section 11 is similar to the second driving section 12 in construction and operation, the explanation with respect to the latter will be omitted as necessary for a concise explanation.

The rectifier 13 includes a transformer 15 in which a primary winding 16, and a secondary winding 17 are provided on a common iron-core 18 as is well-known. A first terminal 16*a* and a second terminal 16*b* are connected to a first end and a second end of the primary winding 16 respectively. In addition, a third terminal 16*c* is tapped out from a mid-point of the primary winding 16. One end 20*a* of an alternating-current voltage source 20 is connected to either the first terminal 16*a* or the third terminal 16*c* of the primary winding 16 via a main switch 21 and a main-relay 22. Since the main relay 22 is in connection with the third terminal 16*c*, upon closure of the main switch 21, a low voltage is induced in the secondary winding 17. On the other hand, upon closure of the main switch 21 after the main-relay 22 has been brought into connection with the first terminal 16*a*, a high voltage is induced in the secondary winding 17. Induced voltage in the secondary winding 17 is converted into direct current by a pair of semi-conductors 23 and 23 and a condenser 24 and is supplied to a common line 25.

In the first driving section 11, there is provided a first relay 27 having a switch 27*a* and a solenoid 27*b* both of which are connected in series between the line 25 and the ground. Between the line 25 and the ground, there are disposed a contact 27*c* of the first relay 27 and a first starting motor 28 both of which are connected to the first starting motor 28 in a well-known manner so as to be started upon closure of the first contact 27*c* after actuation of the solenoid 27*b*. An electromagnetic valve 31, an electromagnetic valve 32 and a clutch coil 33 are interposed between the line 25 and the ground via a switch 34, a switch 35 and a switch 36 respectively.

The control unit 14 includes a CPU and twelve registers given reference numerals 51 through 63. Each of the first register 51 through the fifth register 55 is used as a timer. That is to say, a variable TA, a variable TB, a variable TC, a varible TD and a variable TE are respectively stored in the first register 51 through the fifth register 55. Each variable is set to 0 initially and counts up clock pulses transmitted to the corresponding register. The first register 51, the second register 52, the third register 53, the fourth register 54 and the fifth register 55 are sometimes referred to hereinafter as a first timer, a second timer, a third timer, a fourth timer and a fifth timer respectively. The transmittal of the clock pulses to each register is initiated or terminated by order of the CPU.

A variable R1, a variable R2 and a variable C are stored in the sixth register 56, the seventh register 57 and the eighth register 58 respectively. The contents of the variables R1 and R2 are initialized to 0 and varied according to the revolutions per minute (RPM) of the first engine 29 and the second engine 49 which drive the compressors 91 and 92. Sensors 80 and 81 are provided for the first engine 29 and the second engine 49 so as to detect the RPM thereof. The RPM of the first engine 29 and the second engine 49 are sent to the sixth register 56 and the seventh register 57 in the form of digital signals. The variable C is set to a predetermined value which denotes the steady operation of the first engine 29 and the second engine 49. A variable E, a variable SC1, a variable SC2, a ER1 and a variable ER2 are stored respectively in the registers 59, 60, 61, 62 and 63.

The control unit includes input terminal t0, t9 and t3 which are connected respectively to the main switch 21, a starting switch 19, and the first and second starting motors 28 and 68. The control unit 14 includes output terminals t1, t21, t22, t41, t51, t61, t42, t52 and t62 which are connected respectively to the main relay 22, the first relay 27, a second relay 77, the switch 36, the switch 35, the switch 34, a switch 76, a switch 75 and a switch 74.

Figure 2:
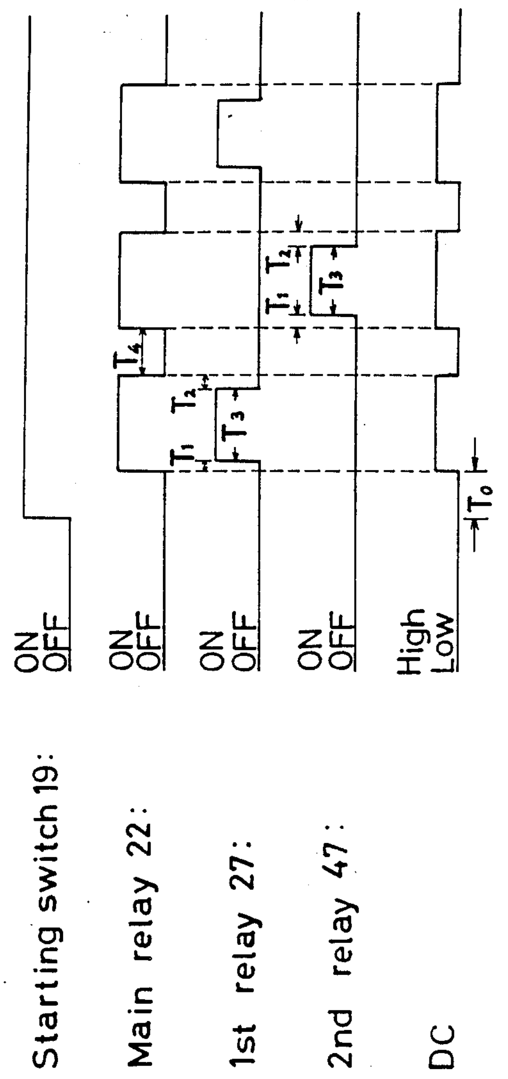
FIG. 2 is a time chart showing on-off timing of each component.
Figure 3:
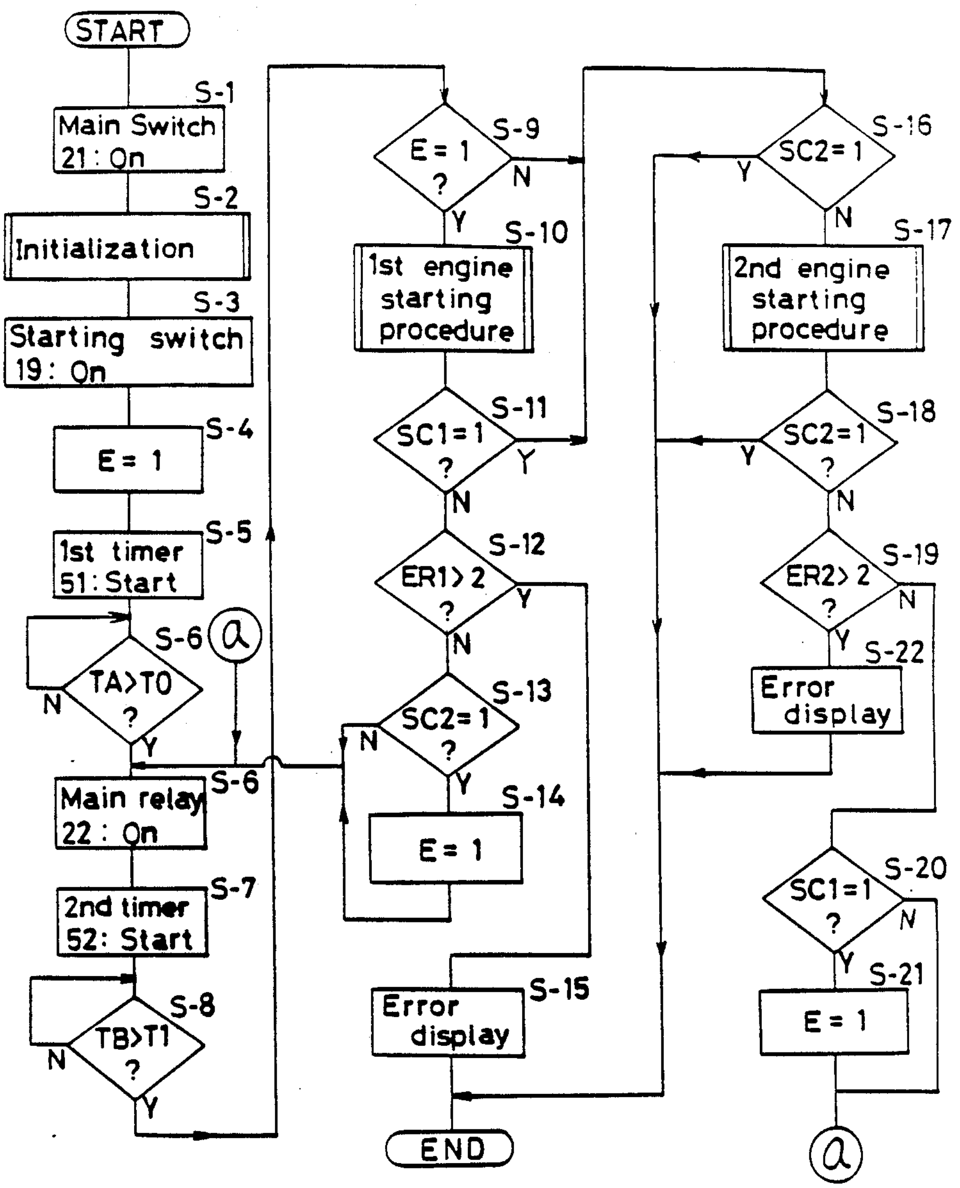
FIG. 3 is a flowchart showing a main procedure by which the apparatus in FIG. 1 is operated.
Figure 4:
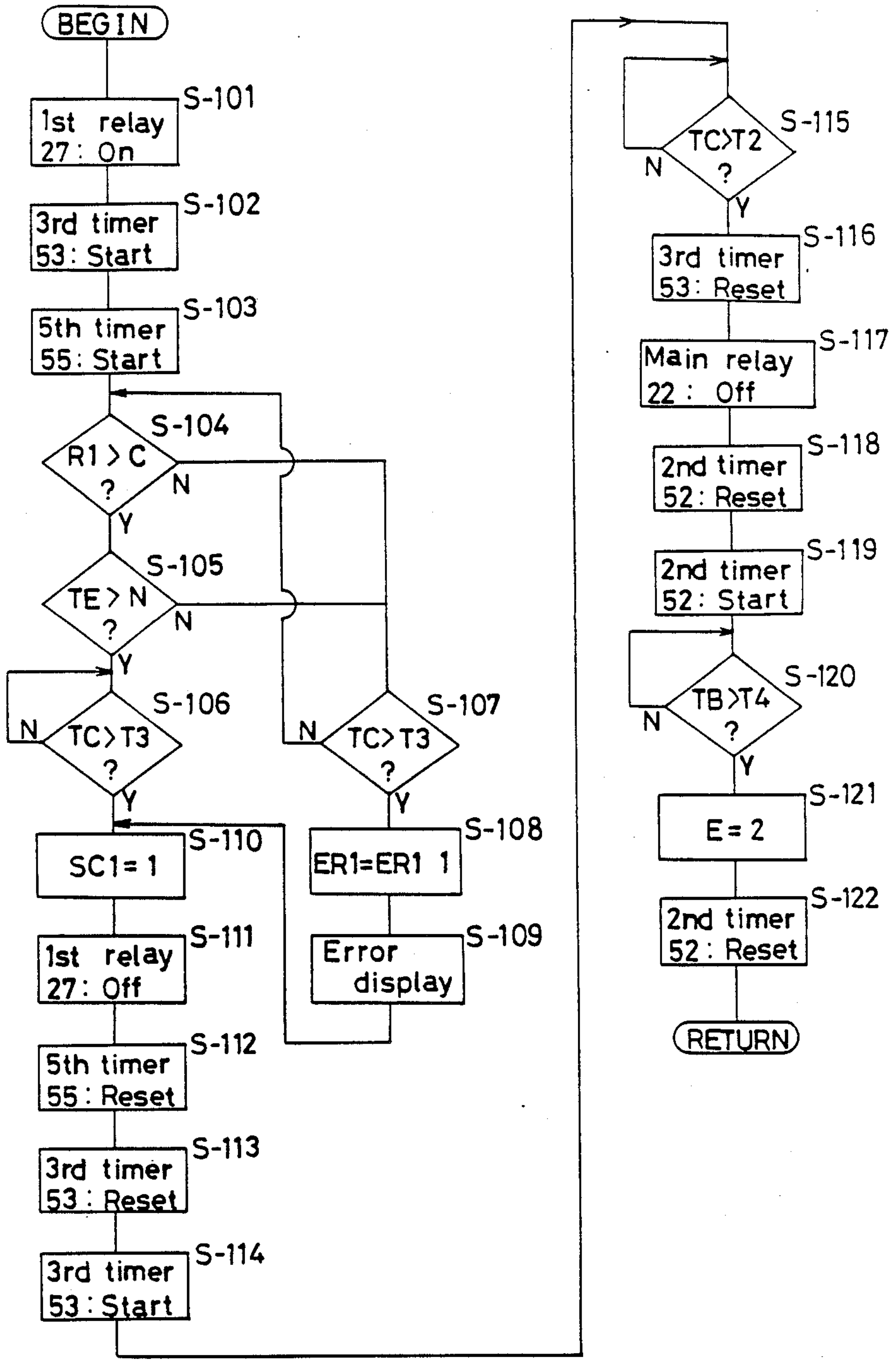
FIG. 4 is a flowchart showing a first engine starting procedure in the form of a sub-routine.

Hereinafter, operation of the starting apparatus 10 will be described in detail with reference to a time chart shown in FIG. 2 and flowcharts shown in FIGS. 3 through 5. First of all, the main switch 21 is closed and an electric circuit is established between the AC voltage source 20 and the rectifier 9 so that the apparatus 10 is ready for operation. Then, an initialization is performed so as to set each timer and the variable in each register. After initialization, upon closure of the starting switch 19 (step s-2), the variable E in the register 59 is set to 1 (step s-3). The result is that the engine to be first operated is the first engine 29. Then, the first timer 51 is started (step s-4). The variable TA in the first timer 51 which counts the number of clock pulses supplied thereto is compared to the time T0 (step s-5). If the CPU does not find that TA is larger than T0, the CPU waits for the time TO to elapse. If the CPU finds that TA is greater than T0, the CPU performs the step s-6 so as to energize the main relay 22, thereby connecting the one end **20*a* of the AC voltage source 20 and the first terminal 16*a* of the primary winding 16 of the transformer 9. Thus, high voltage is induced at the secondary winding 17 and is supplied therefrom to the line 25**.

Simultaneous with the completion of the execution of step s-6, the second timer 52 is started (step s-7). In step s-9, the CPU checks whether or not the first engine 29 is designated. If the answer is positive, the CPU performs the first engine start procedure in step s-10, otherwise it performs the second engine start procedure in step s-17. Though both of the procedures are detailed later, it should be noted that during the first and second engine start procedures, the variable SC1 and SC2 in the registers 62 and 63 are replaced with 1, and the numbers of failed starts in starting the first engine 29 and second engine 49 are accumulated by the variables ER1 and ER2 in the register 60 and the register 61.

After completion of the first engine starting procedure, the CPU checks whether or not the first engine 20 is started successfully in step s-11. If not, the CPU further checks whether or not the variable ER1 is greater than 2 in step s-12. Under the false condition, if the variable SC2 equals 1 (step s-13), the CPU begins to perform step s-6 after setting the variable E to 1 (step s-14). If the variable SC2 is not equal to 1, the CPU performs step s-6. In the case that the result in step s-12 is true, the CPU terminates the engine starting operation after displaying that the first engine 29 is not started in spite of three attempts. If the answer in step s-11 is true, the CPU checks whether or not the variable SC2 equals 1. If the answer is true, the engine starting operation is terminated, otherwise the second engine starting operation procedure is performed in step s-17.

After completion of the second engine starting procedure (step s-19), the CPU checks whether or not the second engine 49 is started successfully (step s-18). If not, the CPU further checks whether or not the variable ER2 is greater than 2 in step s-17. Under the false condition, if the variable SC1 equals 1 (step s-20), the CPU begins to perform step s-6 after setting the variable E to 1 (step s-21). If the variable SC1 is not equal to 1 in step s-20, the CPU performs step s-6. In case the result in step s-19 is true, the CPU terminates the engine starting operation after displaying the non-operation of the second engine 49 after three starting attempts. As explained, if the answer in step s-18 is false, the CPU checks whether or not the first engine 29 is started in step s-20. If, however, the answer is true, the CPU terminates the engine starting operation.

In the first engine start procedure, the first relay 27 for actuating the first starting motor 28 is actuated (step s-101), the third timer 53 is started (step s-102) and the fifth timer 55 is started (step s-103) in turn. The CPU checks whether or not the first engine 29 is brought into operation successfully (steps s-104, s-105, s-106 and s-107). That is to say, in case the RPM R1 of the first engine 29 exceeds a set value C and the resulting condition continues for a set time N within a longer set time T3, the CPU assumes that the first engine 29 is brought into its steady state of operation and the variable SC1 is set to 1 (step s-110). Otherwise, the variable ER1 is incremented (step s-108). The current value of the variable ER1 denotes the numbers of failed attempts to start the first engine and the failure is displayed (step s-109).

Regardless of success or failure in starting the first engine 29, the first relay 27 is turned off (step s-111), the fifth timer 55 is reset (step s-112), and the third timer 53 is reset (step s-113) and re-started (step s-114). After a set time T2 has elapsed, the third timer 53 is reset (step s-116) and the main relay 22 is turned off (step s-117). Then, the second timer 52 is reset (step s-118) and restarted (step s-119). After a set time T4 has elapsed (step s-120), the variable E is set to 2.

Figure 5:
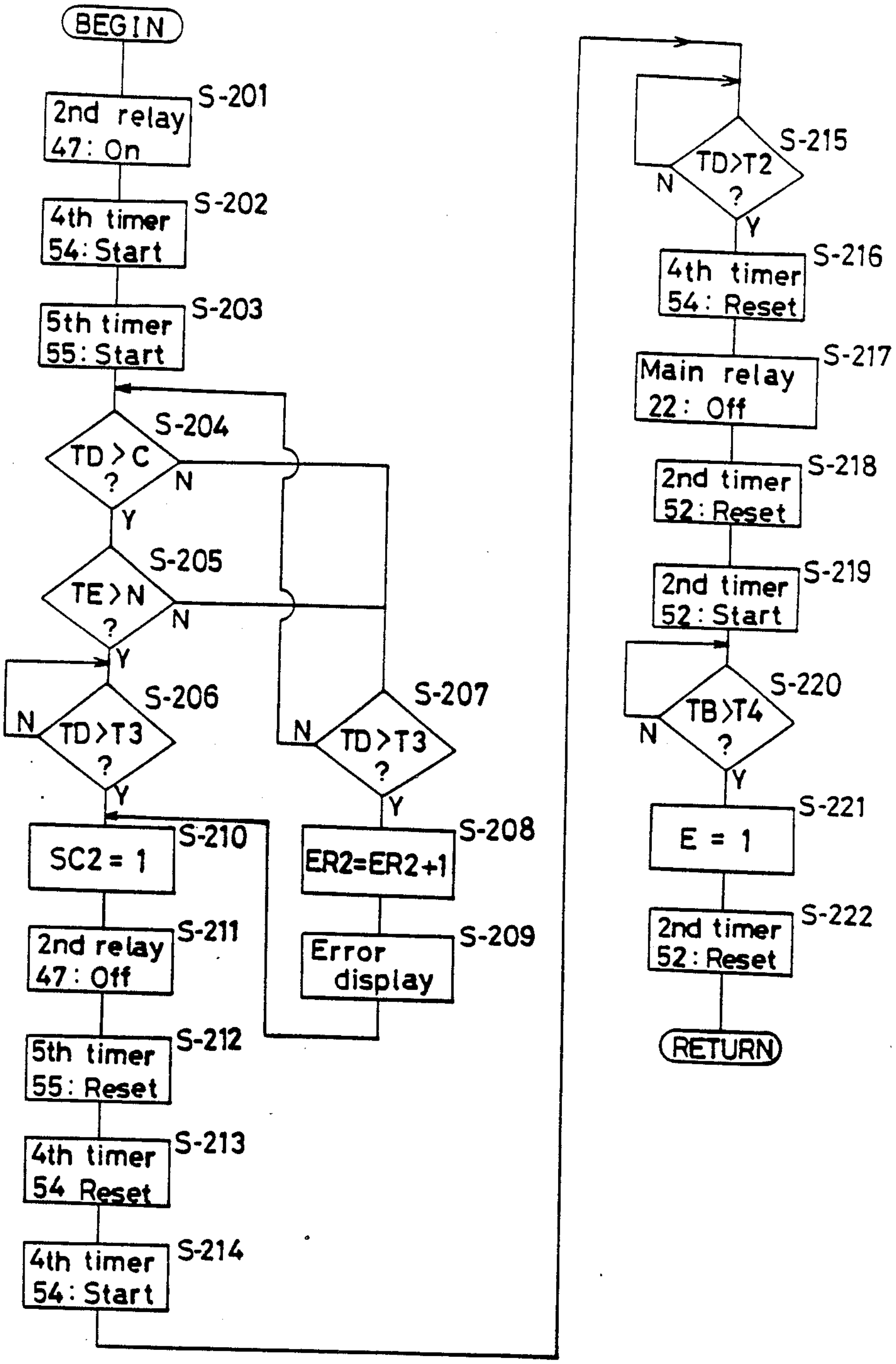
FIG. 5 is a flowchart showing a second engine starting procedure in the form of a sub-routine.

The second engine start procedure shown in FIG. 5 is similar to the first engine start procedure except that the variable SC2, the variable ER2, the fourth timer (variable TD) and the formula E=1 in the latter are replaced with the variable SC1, the variable ER1, the third timer (variable TC) and the formula E=2 in the former, respectively. Thus, the description of the second engine start procedure is omitted.

Figure 6:
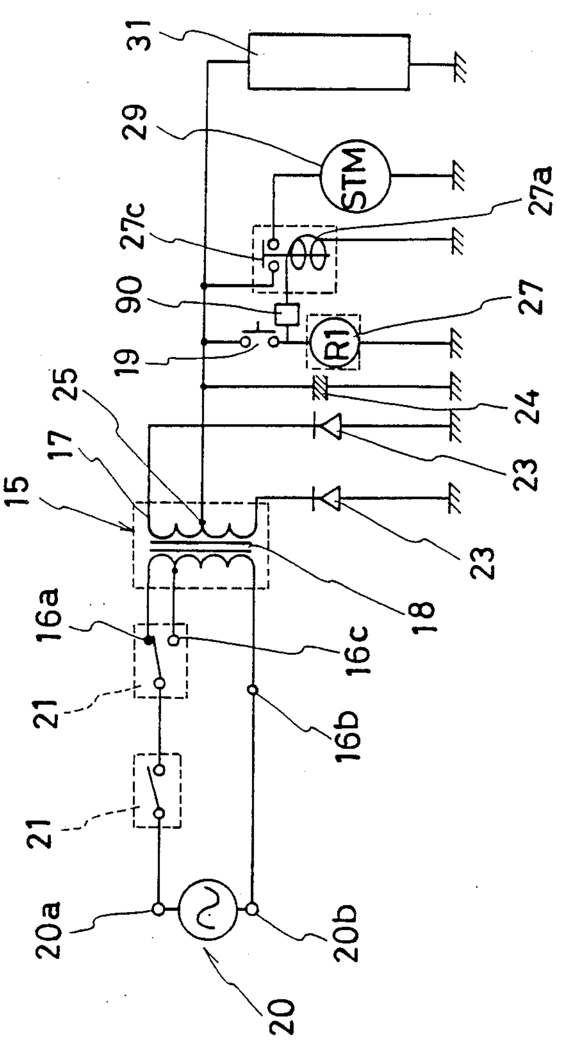
FIG. 6 is an electric circuit of a starting apparatus according to an other embodiment of the present invention.

It should be noted that the second driving section 12 may be omitted. In other words, another starting apparatus is obtained when only one starting motor is operated as shown in FIG. 6. In this embodiment, upon actuation of a main relay 22 as a result of the actuation of a push button 19, a first terminal **16*a* of a primary winding 16 is electrically connected to one end 20*a* of an AC voltage source 20, thereby inducing a high voltage DC in a line 25. After a while, due to operation of a delay circuit 90, another main relay 27 closes its contact 27*c* due to energization of a solenoid 27*a*. Thus, a starting motor 28 is brought into operation. When a set time elapses after the initiation of the motor 28, the button 19 is returned to its original position, thereby interrupting the supply of a high DC voltage to the motor 28**.

The principles, preferred embodiments and modes of operation of the present invention have been described in the foregoing application. The invention which is intended to be protected herein should not, however, be construed as limited to the particular forms disclosed as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A starting apparatus comprising:

an engine for driving a device;

a starting motor operatively connected to said engine and operated at intervals for starting said engine; and a rectifier supplying a high DC voltge to said starting motor during operation thereof and supplying a low DC voltage to one or more electric components in said device while said starting motor is not in operation.

2. A starting apparatus comprising:

a first engine for driving a first device;

a first starting motor operatively connected to said first engine and operated at intervals for starting said first engine;

a second engine for starting a second device;

a second starting motor operatively connected to said second engine and operated at intervals for starting said second engine; and a rectifier supplying a high DC voltage to said first starting motor and said second starting motor while each of said starting motors is in operation and supplying a low DC voltage to one or more electric components in said first and said second devices while both of said starting motors are not in operation.

3. A starting apparatus according to claim 1, wherein said rectifier includes a transformer in which a turns-ratio between a primary winding and a secondary winding is variable.

4. A starting apparatus according to claim 1, wherein said rectifier includes a transformer in which a turns-ratio between a primary winding and a secondary winding is variable.

5. A starting apparatus according to claim 1, wherein said device is a component of a gas heat pump.

6. A starting apparatus according to claim 2, wherein said first device and said second device are respectively a first portion and a second portion of a gas heat pump.

7. A starting apparatus according to claim 5, wherein at least either of said first portion and said second portion is a compressor.

8. A starting apparatus according to claim 2, wherein said first starting motor is not brought into operation while said second starting motor is in operation and vice versa.

9. A method of commonly supplying power to at least one high-voltage starter motor for starting an engine and at least one low-voltage component, comprising the steps of:

supplying a high voltage in common to said starter motor and said component for a period of time having a predetermined maximum;

supplying a low voltage to said component for a period of time having a predetermined minimum;

repeating said supplying steps until said engine is started or an error message is displayed; and thereafter supplying a low voltage to said starter motor and said component.

10. A method of commonly supplying power to a plurality of high-voltage starter motors for starting a corresponding plurality of engines and at least one low-voltage component, comprising the steps of:

supplying said high voltage in turn to one of said starter motors at a time and in common therewith to said component for a period of time having a predetermined maximum;

supplying a low voltage to said component for a period of time having a predetermined minimum; and repeating said supplying steps until each of said engines is started or an error message is displayed therefor, wherein the turn of each starting motor to receive said high voltage is skipped once that motor has started.

* * * * *